(12) United States Patent
Guo et al.

(10) Patent No.: US 10,782,434 B2
(45) Date of Patent: Sep. 22, 2020

(54) CIRCUIT AND METHOD FOR DETECTING MEDIUM UNDER GYPSUM BOARD

(71) Applicant: ZHANGZHOU EASTERN INTELLIGENT METER CO., LTD, Zhangzhou (CN)

(72) Inventors: Mingfeng Guo, Zhangzhou (CN); Zhihong Chen, Zhangzhou (CN); Fanjian Zeng, Zhangzhou (CN); Hailin Huang, Zhangzhou (CN)

( * ) Notice: Subject to any disclaimer, the term of this patent is extended or adjusted under 35 U.S.C. 154(b) by 307 days.

(21) Appl. No.: 16/003,182

(22) Filed: Jun. 8, 2018

(65) Prior Publication Data

US 2018/0292557 A1    Oct. 11, 2018

Related U.S. Application Data

(63) Continuation of application No. PCT/CN2017/086833, filed on Jun. 1, 2017.

(30) Foreign Application Priority Data

Jun. 28, 2016    (CN) .......................... 2016 1 0481571

(51) Int. Cl.
   *G01V 3/08*    (2006.01)
(52) U.S. Cl.
   CPC ................ *G01V 3/088* (2013.01); *G01V 3/08* (2013.01)
(58) Field of Classification Search
   CPC ....... G01V 3/088; G01V 3/08; G01R 27/2605
   USPC ................................. 324/658–690
   See application file for complete search history.

(56) References Cited

U.S. PATENT DOCUMENTS

| 4,099,118 A | 7/1978 | Franklin et al. |
| 5,619,128 A * | 4/1997 | Heger .................... G01B 7/003 |
| | | 324/202 |
| 5,812,057 A | 9/1998 | Hepworth et al. |
| 7,504,817 B2 | 3/2009 | Sanoner et al. |
| 9,599,501 B2 * | 3/2017 | Kokawa ................ G01F 23/263 |
| 2004/0000918 A1 * | 1/2004 | Sanoner ................ G01V 3/088 |
| | | 324/671 |

(Continued)

FOREIGN PATENT DOCUMENTS

| CN | 105334538 A | 2/2016 |
| CN | 106154336 A | 11/2016 |

OTHER PUBLICATIONS

International Search Report of PCT/CN2017/086833 dated Aug. 25, 2017.

*Primary Examiner* — Jeff W Natalini
(74) *Attorney, Agent, or Firm* — Erson IP (Nelson IP)

(57) ABSTRACT

A circuit and a method for detecting a medium under a gypsum board are provided. The method comprises: first, providing a sensor, the sensor consisting of one group of printed circuit board (PCB) copper foils, namely, forming left and right polar plates by two pieces of completely identical PCB copper foils; next, providing a detection drive signal ClK to be applied to the left and right polar plates so that an electromagnetic field is formed between the left and right polar plates and the earth; further, providing a waveform shaping and phase difference circuit so that each polar plate can generate a phase difference relative to its own drive signal; and then, providing an phase inverter circuit to achieve waveform inversion so as to facilitate filtering and amplification of tiny signals, and sampling direct-current voltage signals of the two polar plates by a micro controller unit (MCU).

10 Claims, 1 Drawing Sheet

(56) References Cited

U.S. PATENT DOCUMENTS

2005/0138886 A1\* 6/2005 Sanoner ................ G01V 3/088
324/662
2007/0210785 A1 9/2007 Sanoner et al.
2008/0238403 A1 10/2008 Sanoner et al.
2018/0335539 A1\* 11/2018 Guo ...................... G01V 3/088

\* cited by examiner

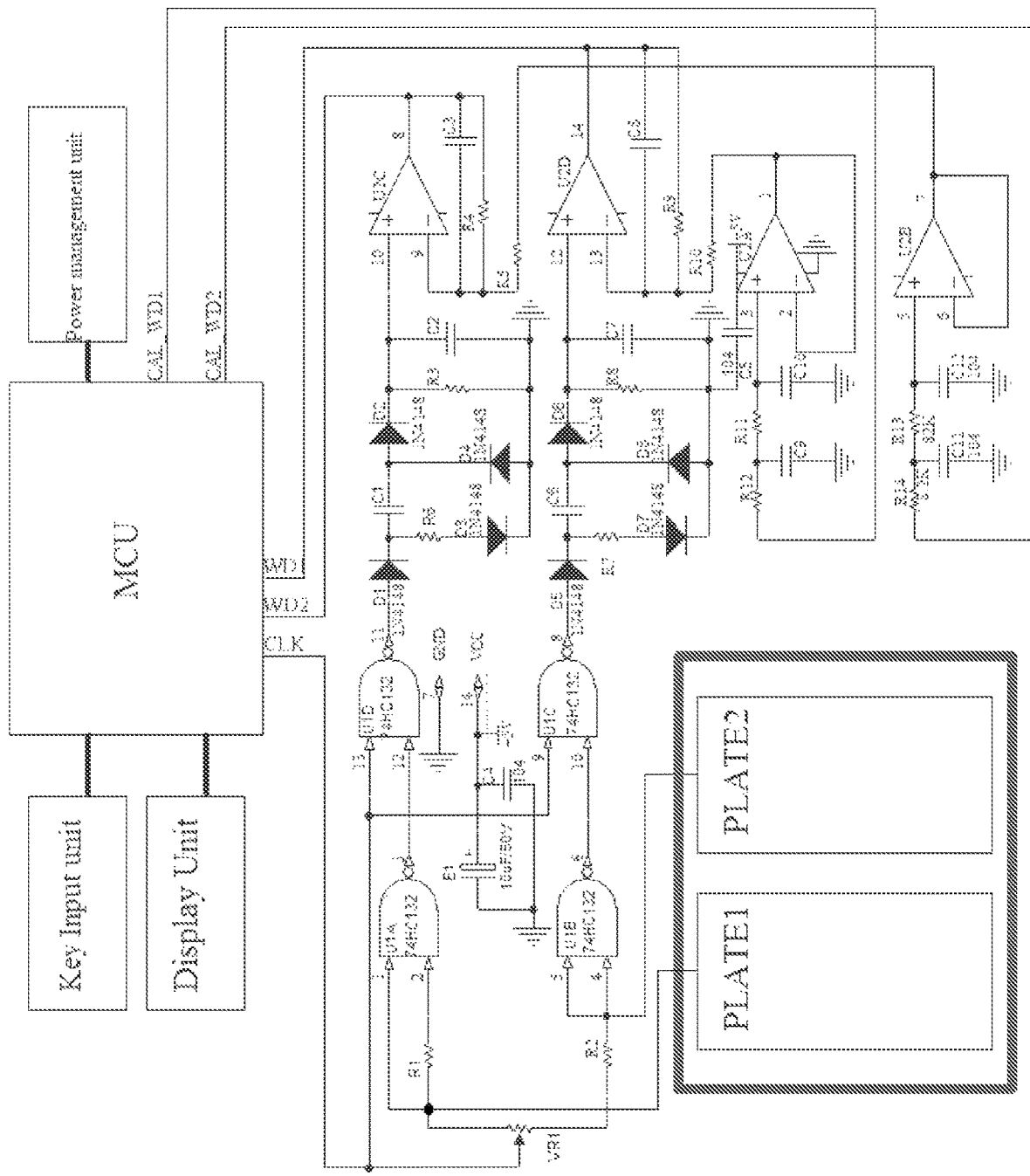

CIRCUIT AND METHOD FOR DETECTING MEDIUM UNDER GYPSUM BOARD

CROSS-REFERENCE TO RELATED APPLICATIONS

This application is a continuation of International Patent Application No. PCT/CN2017/086833 with a filing date of Jun. 1, 2017, designating the United States, now pending, and further claims priority to Chinese Patent Application No. 201610481571.0 with a filing date of Jun. 28, 2016. The content of the aforementioned applications, including any intervening amendments thereto, are incorporated herein by reference.

TECHNICAL FIELD

The disclosure relates to the technical field of medium detection, and particularly relates to a circuit and a method for detecting a medium under a gypsum board.

BACKGROUND OF THE PRESENT INVENTION

A medium detector, as a product, has been on the market for many years. Its core component is a detection sensor composed of parallel plate capacitors (referring to expired U.S. Pat. No. 4,099,118). When a dielectric medium between the parallel plate capacitors changes, the capacitance values of the parallel plate capacitors change, and therefore the existence situation of the medium can be determined according to this change. The existing technologies all adopt detection signals having fixed frequencies to be applied to the sensor.

SUMMARY OF PRESENT INVENTION

It is an object of the disclosure to provide a circuit and a method for detecting a medium under a gypsum board.

The disclosure is achieved by adopting the following technical solution: a circuit for detecting a medium under a gypsum board comprises a micro control unit (MCU), a sensor, a potentiometer, a first resistor, a second resistor, a first waveform shaping circuit, a second waveform shaping circuit, a first phase difference circuit, a second phase difference circuit, a first phase inverter circuit, a second phase inverter circuit, a first resistor-capacitor (RC) filter circuit, a second RC filter circuit, a first second-order RC filter circuit, a second second-order RC filter circuit, a first difference operational circuit, a second difference operational circuit, a first buffer circuit and a second buffer circuit; the sensor consists of one group of printed circuit board (PCB) copper foils, namely consists of two pieces of copper foils having the same shape which are called left and right polar plates; the MCU provides a drive signal ClK having a fixed frequency, the drive signal ClK being connected to an adjustable end of a potentiometer; one end of the potentiometer is connected to the left polar plate via the first resistor to form a first RC charge/discharge circuit, and the other end of the potentiometer is connected to the right polar plate via the second resistor to form a second RC charge/discharge circuit; the first RC charge/discharge circuit outputs a first square wave signal after being connected with the first waveform shaping circuit; the second RC charge/discharge circuit outputs a second square wave signal after being connected with the second waveform shaping circuit; the first square wave signal is connected with one input of a first phase difference circuit, the other input of the first phase difference circuit is connected with the drive signal ClK, and an output of the first phase difference circuit is connected with a first phase difference signal; the second square signal is connected with one input of the second phase difference circuit, the other two inputs of the second phase difference are connected with the drive signal ClK, and an output of the second phase difference circuit is connected with the second phase difference signal; the first phase difference signal is connected with the first RC filter circuit via the first phase inverter circuit and then accesses one input of the first difference operational circuit; the second phase difference signal is connected with the second RC filter circuit via the second phase inverter circuit and then accesses one input of the second difference operational circuit; the MCU outputs a first pulse-width modulation (PWM) reference comparison signal CAL_WD1 and a second PWM reference comparison signal CAL_WD2; CAL_WD1 is connected with the first second-order RC filter circuit, and the filtered signal accesses another input of the first difference operational circuit via the first buffer circuit; the output of the first difference operational circuit is WD1, WD1 being connected with one sampling end of MCU; CAL_WD2 is connected with the second second-order RC filter circuit, and the filtered signal accesses another input of the second difference operational circuit via the second buffer circuit; the output of the second difference operational circuit is WD2, WD2 being connected with the other sampling end of MCU, wherein, the first resistor and the second resistor have the same resistance value.

In the circuit for detecting a medium under a gypsum board provided by the disclosure, first, a sensor is provided, the sensor consisting of one group of printed circuit board (PCB) copper foils, namely, forming left and right polar plates by two pieces of copper foils having the same shape. Next, a detection drive signal ClK is provided to be applied to the left and right polar plates so that an electromagnetic field is formed between the left and right polar plates and the earth. Further, a waveform shaping and phase difference circuit is provided so that each polar plate may generate a phase difference relative to its own drive signal. Then, a phase inverter circuit is also provided to achieve waveform inversion so as to facilitate filtering and amplification of tiny signals. According to the disclosure, the MCU adopts a method for determining a signal inversion time and determining an absolute value of a difference of two signals to determine whether a center signal arrives in deed or not. If intensities of two signals are suddenly enhanced to be larger than a threshold of a system, at this moment, the MCU may ceaselessly calculate the absolute value of the difference of the left and right polar plates and ceaselessly determine whether a movement direction changes or not. If the movement direction suddenly changes at a certain moment, it is considered that a center is found at this moment, center information needs to be instantly displayed. If the absolute value of the difference is suddenly smaller than a design value, it is probably determined that an instrument is near the center at this moment, and center display information may be updated on a display within an error-allowable range. Moreover, different sensitivities are simply and reliably achieved through different PWM duty ratios, and some disadvantages of a linear amplifier are avoided. A practical operation effect is better. Compared with the prior art, the circuit of a detection center provided by the disclosure has strong expansion, and the circuit is more concise and convenient for batch production.

Further, both of the first waveform shaping circuit and the second waveform shaping circuit are NAND gates, wherein, the NAND gates are basic logical circuits in a digital circuit, shape two groups of RC charge/discharge signals into two groups of square wave signals, and are stable in performance, wide in application and beneficial to reduction of production cost.

Further, both of the first phase difference circuit and the second phase difference circuit are NAND gate circuits, wherein, the NAND gates are basic logical circuits in a digital circuit, generate two groups of phase difference signals, are stable in performance, wide in application and beneficial to reduction of production cost.

Further, a type of the NAND gate is 74HC123, wherein, the NAND gate 74HC123 is low in power consumption and wide in working voltage range, may be triggered by a ramp input signal which extremely slowly changes, and outputs a clear and shaking-free signal.

Based on the above embodiment of the circuit for detecting the medium under the gypsum board, further, both of the first phase inverter circuit and the second phase inverter circuit include first-fourth diodes, a resistor and a capacitor, wherein, a first diode positive electrode is connected with an output of the first phase difference circuit or the second phase difference circuit; a first diode negative electrode is respectively connected with one end of the capacitor and one end of the resistor; the other end of the capacitor is respectively connected with a second diode positive electrode and a fourth diode negative electrode; a second diode negative electrode is connected with one end of the first RC filter circuit or one end of the second RC filter circuit; the other end of the resistor is connected with a third diode positive electrode; a third diode negative electrode is connected with a fourth diode positive electrode; the fourth diode positive electrode is connected with the other end of the first RC filter circuit or the other end of the second RC filter circuit, wherein, both of the first phase inverter circuit and the second phase inverter circuit can achieve waveform inversion so as to facilitate filtering and amplification of tiny signals.

Further, a type of the diode is 1N4148, wherein, 1N4148 is a small high-speed switched diode which is rapid in switching, wide in application and low in price.

Based on the above embodiment of the circuit for detecting the medium under the gypsum board, further, the circuit for detecting the medium under the gypsum board also includes a peripheral equipment connected with the MCU, the peripheral equipment including a keyboard, a display device and a power source, wherein, many peripheral equipment interfaces are reserved in the MCU to be conveniently connected with the keyboard, the display device, the power source or the like.

Based on the above embodiment of the circuit for detecting the medium under the gypsum board, further, a type of amplifiers in the first difference operational circuit and the second difference operational circuit is TL064, wherein, the TL064 amplifier has the characteristics of high input impedance, small static current and the like, and is beneficial to reduction of power consumption.

The disclosure is achieved by adopting the following technical solution: a method for detecting a medium under a gypsum board comprises the following steps:

S01: providing a sensor, the sensor consisting of one group of PCB copper foils, namely, consisting of two pieces of PCB copper foils having the same shape which are defined as left and right polar plates;

S02: connecting the drive signal ClK with an adjustable end of a potentiometer; connecting one end of the potentiometer to the left polar plate via a first resistor to output a first RC charge/discharge signal, and connecting the other end of the potentiometer to the right polar plate via a second resistor to output a second RC charge/discharge signal; the first resistor and the second resistor having the same resistance value;

S03: providing two waveform shaping circuits for shaping two groups of RC charge/discharge signals generated in S02 into two groups of square wave signals;

S04: providing two phase difference circuits for performing logical AND operation on two groups of square wave signals output in step S03 respectively together with the CLK signal in S02 to achieve generation of two groups of phase difference signals;

S05: providing two phase inverter circuits for performing phase inverter operation on the two groups of phase difference signals generated in S04;

S06: providing two RC filter circuits to filter and shape the two groups of signals generated in S05 so that the two groups of signals become direct current signals;

S07: performing amplification of proper times and conversion of output impedance on the two groups of direct current signals generated in S06;

S08: providing two PWM reference comparison signals CAL_WD1 and CAL_WD2, duty ratios of the two PWM reference signals being controlled by the MCU;

S09: providing two second-order RC filter circuits for rectifying the two PWM signals CAL_WD1 and CAL_WD2 into direct current signals and two operational buffer circuits for performing impedance conversion on the direct current signals after CAL_WD1 and CAL_WD2 are rectified;

S10: providing two groups of difference signal amplification circuits for performing signal difference operation on the signals output in S09 respectively together with the signals output in S07, and then amplifying the difference signals to acquire two groups of difference amplification circuits; and S11: sampling two groups of difference signal amplification signals output in S10 using MCU, and analyzing the two signals, if WD1>WD2 in the beginning, considering a center is detected when WD2<WD1 is detected; if WD2>WD1 in the beginning, considering the center is detected when WD1<WD2 is detected.

According to the method for detecting the medium under the gypsum board provided by the disclosure, first, a sensor is provided, the sensor consisting of one group of printed circuit board (PCB) copper foils, namely, forming left and right polar plates by two pieces of completely identical PCB copper foils; next, a detection drive signal ClK is provided to be applied to the left and right polar plates so that an electromagnetic field is formed between the left and right polar plates and the earth; further, a waveform shaping and phase difference circuit is provided so that each polar plate may generate a phase difference relative to its own drive signal; and then, a phase inverter circuit is also provided to achieve waveform inversion so as to facilitate filtering and amplification of tiny signals. According to the disclosure, the MCU adopts a method for determining a signal inversion time and determining an absolute value of a difference of two signals to determine whether a center signal arrives in deed or not. At this moment, the MCU may ceaselessly calculate the absolute value of the difference of the left and right polar plates and ceaselessly determine whether a movement direction changes or not. If the movement direction suddenly changes at a certain moment, it is considered that a center is found at this moment, and center information needs to be instantly displayed. If the absolute value of the difference is suddenly smaller than a design value, it is probably determined that an instrument is near the center at this moment, and center display information may be updated on a display within an error-allowable range. Moreover, different sensitivities are simply and reliably achieved through different PWM duty ratios, and some disadvantages of a linear amplifier are avoided. A practical operation effect is better. Compared with the prior art, a detection method provided by the disclosure has the characteristics of concision, stability, strong anti-interference and the like.

Further, the thinner the thickness of the gypsum board needing to be detected, the larger the duty ratios of the first PWM reference comparison signal and the second PWM reference comparison signal are required; the thicker the thickness of the gypsum board needing to be detected, the smaller the duty ratios of the first PWM reference comparison signal and the second PWM reference comparison signal are required. Here, when the detection thickness is relatively thin, detection sensitivity needs to be reduced to lower the sensitivity of the circuit to achieve better anti-interference performance and detection precision, at this moment, a level of a reference signal is required to be relatively high, the PWM duty ratio is required to be relatively large. When the detection thickness is relatively thick, at this moment, the sensitivity of the system is required to be improved, the PWM duty ratio is required to be relatively small. At this moment, the sensitivity of the system is better.

DESCRIPTION OF THE DRAWINGS

For a better illustration of technical solutions in the embodiments of the disclosure or the prior art, drawings required to be used in the embodiments or description of the prior art will be simply introduced below. Throughout the drawings, similar elements or parts are generally marked by similar reference numbers. In the drawings, various elements or parts are not necessarily drawn according to an actual proportion.

FIG. 1 is a circuit principle diagram according to an embodiment of the disclosure.

DETAILED DESCRIPTION OF PREFERRED EMBODIMENTS

The technical solution of the disclosure will be described in detail with reference to the embodiments and accompanying drawings in the following. The following embodiments are only for more clearly illustrating the technical solution of the disclosure, and thus are just considered as examples but not limiting the protection scope of the disclosure.

It should be noted that unless stated otherwise, the technical terms or scientific terms used in the present application should have general meaning understood by those skilled in the art.

The disclosure provides a circuit for detecting a medium under a gypsum board, comprising a micro control unit (MCU), a sensor, a potentiometer, a first resistor, a second resistor, a first waveform shaping circuit, a second waveform shaping circuit, a first phase difference circuit, a second phase difference circuit, a first phase inverter circuit, a second phase inverter circuit, a first resistor-capacitor (RC) filter circuit, a second RC filter circuit, a first second-order RC filter circuit, a second second-order RC filter circuit, a first difference operational circuit, a second difference operational circuit, a first buffer circuit and a second buffer circuit; the sensor consisting of one group of printed circuit board (PCB) copper foils, namely consisting of two pieces of copper foils having the same shape which are called left and right polar plates; the MCU providing a drive signal ClK having a fixed frequency, the drive signal ClK being connected to an adjustable end of a potentiometer; one end of the potentiometer being connected to the left polar plate via the first resistor to form a first RC charge/discharge circuit, and the other end of the potentiometer being connected to the right polar plate via the second resistor to form a second RC charge/discharge circuit; the first RC charge/discharge circuit outputting a first square wave signal after being connected with the first waveform shaping circuit; the second RC charge/discharge circuit outputting a second square wave signal after being connected with the second waveform shaping circuit; the first square wave signal being connected with one input of a first phase difference circuit, another input of the first phase difference circuit being connected with the drive signal ClK, an output of the first phase difference circuit being connected with a first phase difference signal; the second square signal being connected with one input of the second phase difference circuit, the other two inputs of the second phase difference being connected with the drive signal ClK, and an output of the second phase difference circuit being connected with the second phase difference signal; the first phase difference signal being connected with the first RC filter circuit via the first phase inverter circuit and then accessing one input of the first difference operational circuit; the second phase difference signal being connected with the second RC filter circuit via the second phase inverter circuit and then accessing one input of the second difference operational circuit; the MCU outputting a first pulse-width modulation (PWM) reference comparison signal CAL_WD1, a second PWM reference comparison signal CAL_WD2; CAL_WD1 being connected with the first second-order RC filter circuit, and the filtered signal accessing the other input of the first difference operational circuit via the first buffer circuit; the output of the first difference operational circuit being WD1, WD1 being connected with a sampling end of MCU; CAL_WD2 being connected with the second second-order RC filter circuit, and the filtered signal accessing another input of the second difference operational circuit via the second buffer circuit; the output of the second difference operational circuit being WD2, WD2 being connected with the other sampling end of MCU, wherein, the first resistor and the second resistor have the same resistance value.

A circuit principle diagram of an embodiment of the disclosure is seen in FIG. 1. Compared with the prior art, a circuit of a detection center provided by the disclosure has strong expansion, and is more concise and beneficial to batch production.

Specifically, both of the first waveform shaping circuit and the second waveform shaping circuit are NAND gates, wherein, the NAND gates are basic logical circuits in a digital circuit, shape two groups of RC charge/discharge signals into two groups of square wave signals, and are stable in performance, wide in application and beneficial to reduction of production cost.

Specifically, both of the first phase difference circuit and the second phase difference circuit are NAND gate circuits, wherein, the NAND gates are basic logical circuits in a digital circuit, shape two groups of RC charge/discharge signals into two groups of square wave signals, and are stable in performance, wide in application and beneficial to reduction of production cost.

Specifically, a type of the NAND gate is 74HC123, wherein, the NAND gate 74HC123 is low in power consumption and wide in working voltage range, may be triggered by a ramp input signal which extremely slowly changes, and outputs a clear and shaking-free signal.

Specifically, both of the first phase inverter circuit and the second phase inverter circuit include first-fourth diodes, a resistor and a capacitor, wherein, a first diode positive electrode is connected with the output of the first phase difference circuit or the second phase difference circuit; a first diode negative electrode is respectively connected with one end of the capacitor and one end of the resistor; the other end of the capacitor is respectively connected with a second diode positive electrode and a fourth diode negative electrode; a second diode negative electrode is connected with one end of the first RC filter circuit or one end of the second RC filter circuit; the other end of the resistor is connected with a third diode positive electrode; a third diode negative electrode is connected with a fourth diode positive electrode; the fourth diode positive electrode is connected with the other end of the first RC filter circuit or the other end of the second RC filter circuit, wherein, both of the first phase inverter circuit and the second phase inverter circuit can achieve waveform inversion so as to facilitate filtering and amplification of a tiny signal.

Specifically, a type of the diode is 1N4148, wherein, 1N4148 is a small high-speed switched diode which is rapid in switching, wide in application and low in price.

Specifically, the circuit for detecting the medium under the gypsum board also comprises a peripheral equipment connected with the MCU, the peripheral equipment including a keyboard, a display device and a power source, wherein, many peripheral equipment interfaces are reserved in MCU to be conveniently connected with the keyboard, the display device, the power source or the like.

Specifically, a type of amplifiers in the first difference operational circuit and the second difference operational circuit is TL064, wherein, the TL064 operational amplifier has the characteristics of input impedance, small static current and the like, and is beneficial to reduction of power consumption.

The disclosure is achieved by adopting the following technical solution: a method for detecting a medium under a gypsum board comprises: first, providing a sensor, the sensor consisting of one group of printed circuit board (PCB) copper foils, namely, forming left and right polar plates by two pieces of copper foils having the same shape; next, providing a detection drive signal ClK to be applied to the left and right polar plates so that an electromagnetic field is formed between the left and right polar plates and the earth; further, providing a waveform shaping and phase difference circuit, so that each polar plate may generate a phase difference relative to its own drive signal; then, providing an phase inverter circuit to achieve waveform inversion so as to facilitate filtering and amplification of tiny signals. According to the disclosure, the MCU samples direct current voltage signals of two polar plates. If the signal intensity of the left polar plate is larger than that of the right polar plate, the left and right polar plates move together towards the left, and therefore a movement direction is displayed on the display. On the contrary, the left and right polar plates move together towards the right. In theory, when an instrument arrives at the center of the medium, the signals of the left and right polar plates should be equal. But, this state is not extremely stable, and the center signal will be unstable if this method is adopted. Thus, the disclosure adopts a method for determining a signal inversion time and determining an absolute value of a difference of two signals to determine whether a center signal arrives in deed or not. If intensities of two signals are suddenly enhanced to be larger than a threshold of a system, at this moment, the MCU may ceaselessly calculate the absolute value of the difference of the left and right polar plates and ceaselessly determine whether a movement direction changes or not. If the movement direction suddenly changes at a certain moment, it is considered that a center is found at this moment, and center information needs to be instantly displayed. If the absolute value of the difference is suddenly smaller than a design value, it is probably determined that an instrument is near the center at this moment, and center display information may be updated on a display within an error-allowable range.

Here, there is a problem that when we adopt the same sensitivity to detect substances having different thicknesses, if the detected surface is relatively thin, at this moment, large sensitivity may cause a large error index, and in the test process, the anti-interference capability of the system may be deteriorated due to extremely high sensitivity. At this moment, sensitivity of hardware must be reduced as far as possible if a good test effect is desired. It can be seen from the above description that we may achieve different sensitivities through different PWM duty ratios. The method is simple and reliable, and can avoid some disadvantages of a linear amplifier. A practical operation process is better in effect.

The method specifically comprises the following steps:

S01: providing a sensor, the sensor consisting of one group of PCB copper foils, namely, consisting of two pieces of PCB copper foils having the same shape which are defined as left and right polar plates;

S02: connecting the drive signal ClK with an adjustable end of a potentiometer; connecting one end of the potentiometer to the left polar plate via a first resistor to output a first RC charge/discharge signal, and connecting the other end of the potentiometer to the right polar plate via a second resistor to output a second RC charge/discharge signal; the first resistor and the second resistor having the same resistance value;

S03: providing two waveform shaping circuits for shaping two groups of RC charge/discharge signals generated in S02 into two groups of square wave signals;

S04: providing two phase difference circuits for performing logical AND operation on two groups of square wave signals output in step S03 respectively together with the CLK signal in S02 to achieve generation of two groups of phase difference signals;

S05: providing two phase inverter circuits for performing inverting phase operation on the two groups of phase difference signals generated in S04;

S06: providing two RC filter circuits to filter and shape the two groups of signals generated in S05, so that the two groups of signals become direct current signals;

S07: performing amplification of proper times and conversion of output impedance on the two groups of direct current signals generated in S06;

S08: providing two PWM reference comparison signals CAL_WD1 and CAL_WD2, duty ratios of the two PWM reference signals being controlled by the MCU;

S09: providing two second-order RC filter circuits for rectifying the two PWM signals CAL_WD1 and CAL_WD2 into direct current signals and two operational buffer circuits for performing impedance conversion on the direct current signals after CAL_WD1 and CAL_WD2 are rectified;

S10: providing two groups of difference signal amplification circuits for performing signal difference operation on the signals output in S09 respectively together with the signals output in S07, and then amplifying the difference signals to acquire two groups of difference amplification circuits; and S11: sampling two groups of difference signal amplification signals output in S10 using MCU, and analyzing the two signals, if WD1>WD2 in the beginning, considering a center is detected when WD2<WD1 is detected; if WD2>WD1 in the beginning, considering the center is detected when WD1<WD2 is detected.

According to the method for detecting the medium under the gypsum board, first, a sensor is provided, the sensor consisting of one group of printed circuit board (PCB) copper foils, namely, forming left and right polar plates by two pieces of copper foils having the same shape; next, a detection drive signal ClK is provided to be applied to the left and right polar plates so that an electromagnetic field is formed between the left and right polar plates and the earth; further, a waveform shaping and phase difference circuit is provided so that each polar plate may generate a phase difference relative to its own drive signal; then, a phase inverter circuit is also provided to achieve waveform inversion so as to facilitate filtering and amplification of tiny signals. According to the disclosure, the MCU adopts a method for determining a signal inversion time and determining an absolute value of a difference of two signals to determine whether a center signal arrives in deed or not. If intensities of two signals are suddenly enhanced to be larger than a threshold of a system, at this moment, the MCU may ceaselessly calculate the absolute value of the difference of the left and right polar plates and ceaselessly determine whether a movement direction changes or not. If the movement direction suddenly changes at a certain moment, it is considered that a center is found at this moment, center information needs to be instantly displayed. If the absolute value of the difference is suddenly smaller than a design value, it is probably determined that an instrument is near the center at this moment, and center display information may be updated on a display within an error-allowable range. Moreover, different sensitivities are simply and reliably achieved through different PWM duty ratios, and some disadvantages of a linear amplifier are avoided. A practical operation process is better in effect. Compared with the prior art, the detection center provided by the disclosure has the characteristics of concision, stability, strong anti-interference and the like.

When detection thickness is relatively thin, detection sensitivity needs to be reduced to reduce the sensitivity of the circuit to achieve better anti-interference performance and detection precision, at this moment, the level of the reference signal needs to be relatively high, and PWM duty ratio needs to be relatively large. When the detection thickness is relatively thick, at this moment, the sensitivity of the system needs to be improved, and PWM duty ratio needs to be relatively small. At this moment, the sensitivity of the system may be better.

In the description of the disclosure, reference made to descriptions of reference terms "one embodiment", "some embodiments", "example", "specific example" or "some examples" and the like refers to being contained in at least one embodiment or example in combination with specific features, structures, materials or characteristics described by this embodiment or example. In the present specification, schematic representation of the above terms does not necessarily aim at the same embodiment or example. Moreover, described specific features, structures, materials or characteristics are combined in any one or several embodiments or examples in an appropriate manner. In addition, under the condition of non-mutual contradiction, those skilled in the art shall make binding and combination on different embodiments or examples described in the present description and features of different embodiments or examples.

It is noted that flow charts and block diagrams in drawings show system architectures, functions and operations that are possibly achieved by servers, methods and computer program products according to several embodiments of the disclosure. At this point, each box in the flow charts and block diagrams may represent a module, a program segment or a part of a code, the module, the program segment or a part of the code contains one or more executable instructions for achieving specified logical functions. It is also noted that in some achievement as alternatives, functions marked in the boxes may also be generated in a sequence different from that marked in drawings. For example, two consecutive boxes may be executed in basically parallel, they may be executed in an opposite sequence sometime, which is determined depending on involved functions. It is also noted that each box in box diagrams and/or flow charts and combination of boxes in box diagrams and/or flow charts may be achieved using hardware-based servers special for executing specified functions or actions, or may be achieved using combination of special hardware and computer instructions.

Configuration devices provided by embodiments of the disclosure may be computer program products, including a computer readable memory medium in which program codes are stored, instructions included in the program codes may be used for executing methods described in the above method embodiments, and specific achievement is seen in method embodiments, and is not further described here.

Those skilled in the art may clearly know that, for convenience and concision of the description, specific working processes of the above described servers, devices and units may refer to corresponding processes in the above method embodiments, and are not further described here.

It should be understood in several embodiments provided by the present application that the disclosed servers, devices and methods may be achieved through other manners. The above described device embodiments are only exemplary, as an example, division of the unit is merely a logical function division, and may be actually achieved in other division manners, as another example, a plurality of units or assemblies may be combined or integrated to another server, alternatively, some features may be ignored, or not executed. At another point, the displayed or discussed mutual coupling or direct coupling or communication connection may be indirect coupling or communication connection through some communication interfaces, devices or units, and may be of electrical, mechanical or other forms.

The units described as separation components may be or may not be physically separated, components displayed as units may be or may not be physical units, that is, may be located at one position, or may also be issued to a plurality of network units. A part or all of the units may be selected according to practical demand to achieve the object of the present embodiment solution.

In addition, various functional units in various embodiments of the disclosure may be integrated in one processing unit, or various units may separately and physically exist, or two or more than two units may be integrated in one unit.

When the functions are achieved in a form of software functional units and sold or used as independent products, they may be stored in one computer readable memory medium. Based on understanding like this, the technical solution of the disclosure, or parts contributing to the prior art, or parts of this technical solution may be embodied in a form of software products, the computer software products are stored in one memory medium, including several instructions for allowing one computer device (which may be a personal computer, a server, or network equipment, etc.) to execute all or a part of steps of the methods of various embodiments of the disclosure. And the above memory medium includes a U disk, a mobile hard disk drive, a read-only memory (ROM), a random access memory (RAM), a diskette, an optical disk or other various mediums capable of storing program codes.

Finally, it is noted that the above embodiments are merely for illustrating the technical solution of the disclosure but not limiting thereto; although the disclosure is described in detail by reference to the above embodiments, those of ordinary skill in the art should understand that they still can make modifications to the technical solutions described in the above embodiments, or make equivalent substitutions to a part or all of the technical features; however, these modifications or substitutions do not allow the natures of corresponding technical solutions to depart from the scopes of the technical solutions of various embodiments of the disclosure, and should be all included in the scope of the claims and description of the disclosure.

We claim:

1. A circuit for detecting a medium under a gypsum board, comprising a micro control unit (MCU), a sensor, a potentiometer, a first resistor, a second resistor, a first waveform shaping circuit, a second waveform shaping circuit, a first phase difference circuit, a second phase difference circuit, a first phase inverter circuit, a second phase inverter circuit, a first resistor-capacitor (RC) filter circuit, a second RC filter circuit, a first second-order RC filter circuit, a second second-order RC filter circuit, a first difference operational circuit, a second difference operational circuit, a first buffer circuit and a second buffer circuit;

the sensor consisting of: a left polar plate that is a first piece of printed circuit board (PCB) copper foil; and a right polar plate, having a shape same to that of the left polar plate, wherein the right polar plate is a second piece of printed circuit board copper foil;

the MCU providing a drive signal CLK having a fixed frequency, the drive signal CLK being an input to an adjustable input of the potentiometer; one end of the potentiometer being connected to the left polar plate via the first resistor to form a first RC charge/discharge circuit, and the other end of the potentiometer being connected to the right polar plate via the second resistor to form a second RC charge/discharge circuit;

the first RC charge/discharge circuit configured to connect to the first waveform shaping circuit, and the first waveform shaping circuit configured to output a first square wave signal; the second RC charge/discharge circuit configured to connect to the second waveform shaping circuit, and the second waveform shaping circuit configured to output a second square wave signal;

the first square wave signal configured to be provided to one input of the first phase difference circuit, another input of the first phase difference circuit is the drive signal CLK, and an output of the first phase difference circuit is a first phase difference signal; the second square wave signal configured to be provided to one input of the second phase difference circuit, the other input of the second phase difference circuit is the drive signal CLK, and an output of the second phase difference circuit is a second phase difference signal;

the first phase difference signal configured to pass through the first phase inverter circuit and subsequently pass through the first RC filter circuit, wherein the output of the first RC filter circuit is connected to one input of the first difference operational circuit; the second phase difference signal configured to pass through the second phase inverter circuit and subsequently pass through the second RC filter circuit, wherein the output of the second RC filter circuit is connected to one input of the second difference operational circuit; a first output pin of the MCU that outputs a first pulse-width modulation (PWM) reference comparison signal CAL_WD1 is connected to an input of the first second-order RC filter circuit, and a second output pin of the MCU that outputs a second PWM reference comparison signal CAL_WD2 is connected to an input of the second second-order RC filter circuit; an output of the first second-order RC filter circuit configured to pass through the first buffer circuit and subsequently pass through another input of the first difference operational circuit; an output of the first difference operational circuit being WD1 is connected with one sampling end of the MCU; and an output of the second second-order RC filter circuit configured to pass through the second buffer circuit and subsequently pass through another input of the second difference operational circuit; an output of the second difference operational circuit being WD2 is connected with the other sampling end of the MCU, wherein, the first resistor and the second resistor have a same resistance value.

2. The circuit for detecting a medium under a gypsum board according to claim 1, wherein, both of the first waveform shaping circuit and the second waveform shaping circuit are NAND gates.

3. The circuit for detecting a medium under a gypsum board according to claim 2, wherein, a type of the NAND gate is 74HC123.

4. The circuit for detecting a medium under a gypsum board according to claim 1, wherein, both of the first phase difference circuit and the second phase difference circuit are NAND gate circuits.

5. The circuit for detecting a medium under a gypsum board according to claim 1, wherein, each of the first phase inverter circuit and the second phase inverter circuit include a first diode, a second diode, a third diode, and a fourth diode, a third resistor and a capacitor;

wherein, a positive electrode of the first diode is connected with the output of the first phase difference circuit or the second phase difference circuit; a negative electrode of the first diode is respectively connected with one end of the capacitor and one end of the third resistor; the other end of the capacitor is respectively connected with a positive electrode of the second diode and a negative electrode of the fourth diode; a negative electrode of the second diode is connected with a first input of the first RC filter circuit or a first input of the second RC filter circuit; the other end of the third resistor is connected with a positive electrode of the third diode; a negative electrode of the third diode is connected with a fourth diode positive electrode of the fourth diode; the positive electrode of the fourth diode is connected with a second input of the first RC filter circuit or a second input of the second RC filter circuit.

6. The circuit for detecting a medium under a gypsum board according to claim 5, wherein, each type of the first, second, third, and fourth diodes is 1N4148.

7. The circuit for detecting a medium under a gypsum board according to claim 1, also comprising a peripheral equipment connected with the MCU, the peripheral equipment including a keyboard, a display device and a power source.

8. The circuit for detecting a medium under a gypsum board according to claim 1, wherein, a type of amplifiers in the first difference operational circuit and the second difference operational circuit is TL064.

9. A method for detecting a medium under a gypsum board, comprising the following steps:
- S01: providing a sensor, the sensor consisting of: a left polar plate that is a first piece of printed circuit board (PCB) copper foil; and a right polar plate, having a shape same to that of the left polar plate, wherein the right polar plate is a second piece of printed circuit board copper foil;
- S02: providing the drive signal CLK as an input to an adjustable input of a potentiometer; connecting one end of the potentiometer to the left polar plate via a first resistor to output a first RC charge/discharge signal, and connecting the other end of the potentiometer to the right polar plate via a second resistor to output a second RC charge/discharge signal; the first resistor and the second resistor having a same resistance value;
- S03: providing the first and second RC charge/discharge signal to a first and second waveform shaping circuit respectively to generate a first and second square wave signal;
- S04: providing the generated first and second square wave signal to a first and second phase difference circuit respectively for performing logical AND operations generate a first and second phase difference signal;
- S05: providing the first and second phase difference signal to a first and second two phase inverter circuit respectively for performing phase inverter operations to generate a first and second inverted signal;
- S06: providing the first and second inverted signal to a first and second RC filter circuit to filter and shape the first and second inverted signal and generating a first and second direct current signal;
- S07: amplifying the first and second direct current signal;
- S08: providing a first and second PWM reference comparison signal CAL_WD1 and CAL_WD2 to a first and second second-order RC filter circuit to rectify the first and second PWM reference comparison signals, duty ratios of the first and second PWM reference comparison signals being controlled by the MCU;
- S09: providing the amplified first direct current signal and the first PWM reference comparison signal to a first difference signal amplification circuit to perform a first signal difference operation and amplification, and generating a first amplified difference signal;
- S10: providing the amplified second direct current signal and the second PWM reference comparison signal to a second difference signal amplification circuit to perform a second signal difference operation and amplification, and generating a second amplified difference signal; and
- S11: analyzing the first and second amplified difference signals to determine whether a center of the medium under the gypsum board is detected.

10. The method for detecting a medium under a gypsum board according to claim 9, wherein the duty ratios of the first and second PWM reference comparison signals depend on thickness of the gymsum board.

* * * * *